(12) United States Patent
Howe et al.

(10) Patent No.: US 9,128,911 B1
(45) Date of Patent: Sep. 8, 2015

(54) ESTIMATING HIGH LEVEL TAX REFUND RANGE

(75) Inventors: Carol Ann Howe, San Diego, CA (US); Jane L. Ryder, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 533 days.

(21) Appl. No.: 13/460,570

(22) Filed: Apr. 30, 2012

(51) Int. Cl.
   *G06F 17/22* (2006.01)
   *G07F 19/00* (2006.01)

(52) U.S. Cl.
   CPC ..................................... *G06F 17/22* (2013.01)

(58) Field of Classification Search
   None
   See application file for complete search history.

(56) References Cited

U.S. PATENT DOCUMENTS

| | | | |
|---|---|---|---|
| 7,127,425 B1 * | 10/2006 | Wilson | 705/38 |
| 8,239,318 B1 * | 8/2012 | Bradley et al. | 705/38 |
| 8,364,518 B1 * | 1/2013 | Blake et al. | 705/7.32 |

* cited by examiner

*Primary Examiner* — Paul Danneman
(74) *Attorney, Agent, or Firm* — Osha Liang LLP

(57) ABSTRACT

A method to estimate a tax refund range. The method includes receiving, by a computer processor and from a user, a reduced portion of tax preparation input data prior to receiving a remainder portion of the tax preparation input data, calculating, by the computer processor and prior to receiving the remainder portion, a tax refund range estimate based on the reduced portion, presenting the tax refund range estimate to the user, and receiving, in response to presenting the tax refund range estimate to the user, the remainder portion for later use when preparing a tax filing for the user.

21 Claims, 5 Drawing Sheets

ESTIMATING HIGH LEVEL TAX REFUND RANGE

BACKGROUND

A tax refund is a refund on taxes when the tax liability is less than the taxes paid. Taxpayers can often receive a tax refund when filing their income tax return if the tax owed is less than the sum of the total amount of the withholding taxes and estimated taxes (if any) paid, plus any refundable tax credits that they claim. The amount of the tax refund is typically determined when tax return is filed, which is at a time when the tax liabilities, the withholding taxes, the estimated taxes paid, and the tax credits have been determined.

SUMMARY

In general, in one aspect, the invention relates to a method to estimate a tax refund range. The method includes receiving, by a computer processor and from a user, a reduced portion of tax preparation input data prior to receiving a remainder portion of the tax preparation input data, calculating, by the computer processor and prior to receiving the remainder portion, a tax refund range estimate based on the reduced portion, presenting the tax refund range estimate to the user, and receiving, in response to presenting the tax refund range estimate to the user, the remainder portion for later use when preparing a tax filing for the user.

In general, in one aspect, the invention relates to a system to estimate a tax refund range. The system includes (i) a processor, (ii) a user module executing on the processor and configured to receive, from a user, a reduced portion of tax preparation input data prior to receiving a remainder portion of the tax preparation input data, present a tax refund range estimate to the user, and receive, in response to presenting the tax refund range estimate to the user, the remainder portion for later use when preparing a tax filing for the user, and (iii) a refund calculator executing on the processor and configured to calculate, prior to receiving the remainder portion, the tax refund range estimate based on the reduced portion.

In general, in one aspect, the invention relates to a non-transitory computer readable medium storing instructions to estimate a tax refund. The instructions, when executed by a computer processor, includes functionality to receive from a user, a reduced portion of tax preparation input data prior to receiving a remainder portion of the tax preparation input data, calculate, prior to receiving the remainder portion, a tax refund range estimate based on the reduced portion; present the tax refund range estimate to the user, and receive, in response to presenting the tax refund range estimate to the user, the remainder portion for later use when preparing a tax filing for the user.

Other aspects of the invention will be apparent from the following detailed description and the appended claims.

DETAILED DESCRIPTION

Figure 1:
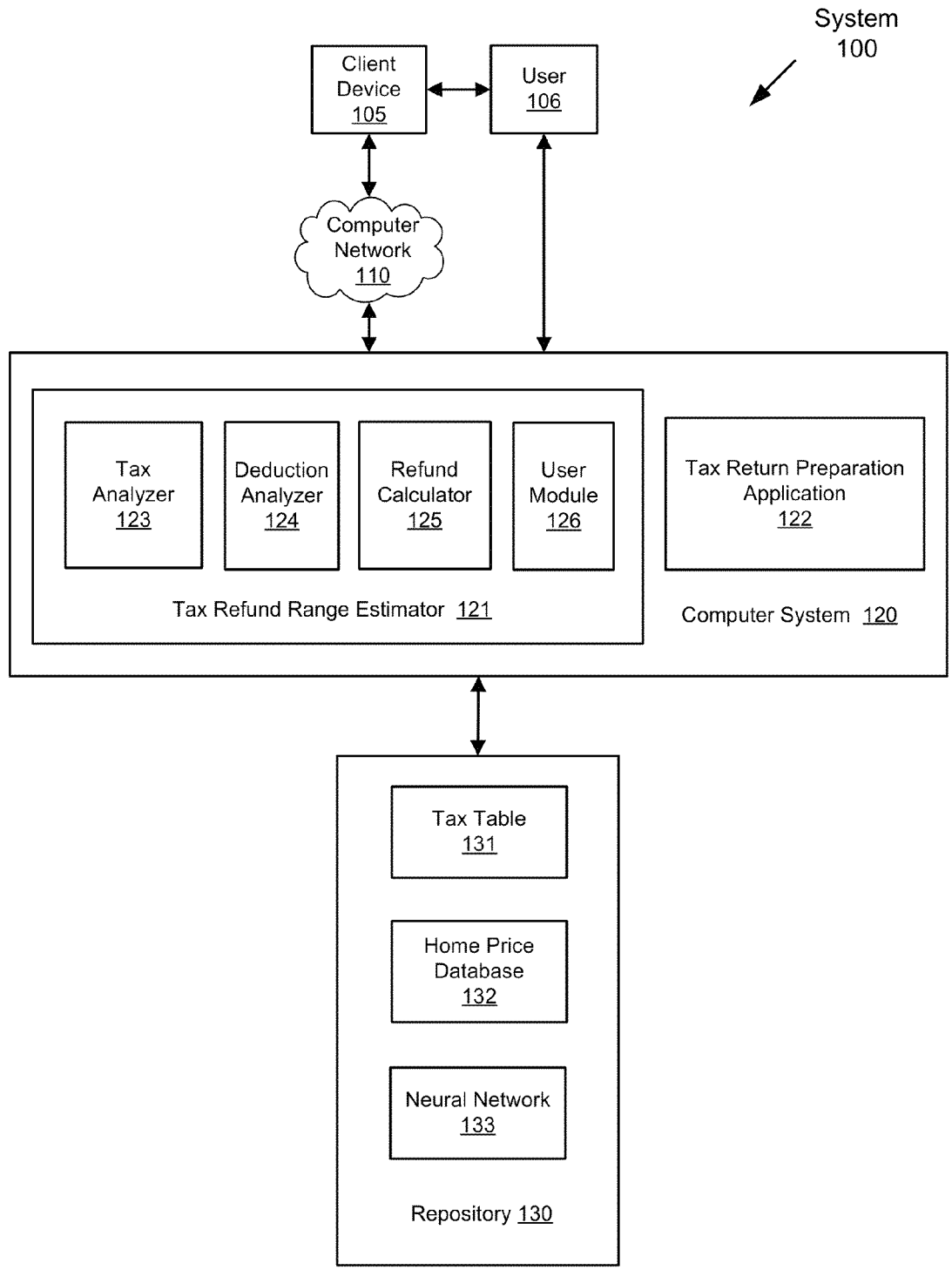
FIG. 1 shows a schematic diagram of a system for estimating high level tax refund in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

From time to time, taxpayers wish to determine a high-level estimate of their tax refund without entering in all their tax related information. Rather than entering in all their tax document details, embodiments of the invention provide taxpayers with a high-level range for their tax refund based on a small subset of questions (e.g., 5-10 questions, such as martial status, home ownership, dependents, income, age, educational/tuition expenses, and self-employment status). The estimated refund range would narrow and become more accurate as the customer enters in more data. Additionally, this workflow is customized based on the subset of questions answered by the taxpayer. Said in other words, a taxpayer is presented with an adaptively modified user interface screen based on what he/she has already answered. Accordingly, embodiments of the invention provide a gateway for new customers to try a simple tax software product to build confidence in their ability to prepare their own return using the tax software. A quick estimation of the refund range increases consumer confidence in the tax preparation software. Currently in traditional tax preparation software, income items are added first which understates the projected refund and causes customers to leave the program. By presenting the user with a refund range, the program encourages the user to continue preparing their return and reduces unnecessary worry about their finances and whether the program is accurate.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1. The system (100) of FIG. 1 depicts the components of a tax refund range estimate system in accordance with embodiments disclosed herein.

As shown in FIG. 1, the system (100) includes a user (106) using a client device (105) to access a computer system (120) that is installed with a tax refund range estimator (121) and a tax return preparation application (122). In one or more embodiments, the client device (105) may be a desktop computer, a notebook computer, a tablet computer, a smart phone, or other mobile device with computing and communication capabilities. In one or more embodiments, the user (106) may be an individual taxpayer, an agent of the taxpayer, or a person that prepares a tax filing for a business entity (not shown). For example, the user (106) may be a small business owner, an employee, a contractor, a certified public accountant, bookkeeper, etc. Throughout this disclosure, the terms user and taxpayer may be used interchangeably depending on the context. Further, as used herein, a tax filing may be the filing of an income tax return for the taxpayer or any other filings with a taxing authority (state or federal).

In addition, the tax refund range estimator (121) includes a tax analyzer (123), deduction analyzer (124), refund calculator (125), and user module (126). Further, the system (100) includes a repository (130) storing a tax table (131), home price database (132), and a neural network (133). The repository (130) may be a disk memory storage device, a semiconductor memory storage device, or other suitable computer data storage device. In one or more embodiments, a portion of the repository (130) may be integrated in the computer system (120) and/or the client device (105). In one or more embodiments, the tax refund range estimator (121) or a portion thereof may be downloaded/installed onto the client device (105). Various components of the system (100) are coupled via a computer network (110). For example, the computer network may include wired and/or wireless portions of public and/or private data network, such as wide area networks (WANs), local area networks (LANs), Internet, a mobile phone network, and etc.

In one or more embodiments, the tax refund range estimator (121) includes the user module (126) that is configured to request, from the user (106), a reduced portion of tax preparation input data. The tax preparation input data, as is known to those skilled in the art, may include a W2 form reporting employee wage, various tax reporting statements from financial institutions reporting mortgage interest and investment income, and a large number of taxpayer provided information to report various tax related expenses and/or credits. In one or more embodiments, the reduced portion includes a substantially smaller subset compared to the complete tax preparation input data. For example, the reduced portion may include an income amount, marital status, age of the user, a number of dependents, age of the dependent, home ownership, residence zip code, and/or self-employment status. In one or more embodiments, the reduced portion includes less than 10 items. Said in other words, the user (106) is requested to answer less than 10 questions where the less than 10 answers are sufficient to provide the reduced portion. In one or more embodiments, the request is sent from the computer system (120) to the client device (105). For example, less than 10 questions may be displayed on the client device (105) and presented to the user (106).

In response to the request for the reduced portion, the user module (126) receives, from the user (106), the reduced portion prior to receiving a remainder portion of the tax preparation input data. In one or more embodiments, the reduced portion is provided by the user (106) via the client device (105) and sent to the computer system (120). Those skilled in the art will appreciate that the effort for the user (106) to provide this reduced portion is substantially reduced compared to providing the complete tax preparation input data. Further, the computing capability requirement for the client device (105) is substantially reduced compared to the requirement to effectively capture the complete tax preparation input data. For example, while it is reasonable to enter less than 10 answers using a virtual keypad and/or voice input on a smart phone or a tablet computer, it would be inefficient and time consuming for a typical user to continue entering the remainder portion to complete the entire tax preparation input data using the virtual keypad and/or voice input without a lot of re-typing, practicing, and patience.

In one or more embodiments, the tax refund range estimator (121) includes a refund calculator (125) that is configured to calculate, prior to receiving the remainder portion, the tax refund range estimate based on the reduced portion. In one or more embodiments, the tax refund range estimate is calculated based on IRS tax rates, IRS payroll withholding charts, average price per home and average mortgage interest paid on such homes, average charitable contributions per income level, average age of children in U.S. households, etc. In one or more embodiments, the tax refund range estimate is calculated using one or more formulae that is generated based on historical tax filings from a sample set of taxpayers. For example, the one or more formulae may be generated using non-linear regression, multivariate analysis, neural network, or other suitable statistical techniques. For example, historical IRS tax rates, historical IRS payroll withholding charts, historical average price per home and average mortgage interest paid on such homes, historical average charitable contributions per income level, historical average age of children in U.S. households, etc. as well as income amount, marital status, age of the user, a number of dependents, age of the dependent, home ownership, residence zip code, self-employment status, and tax refund amount of historical tax filings may be used as training dataset to train the neural network (133) such that the trained neural network (133) is able to output calculated tax refund range amounts that match historical tax refund amounts (i.e., actual tax refund amount reported in prior tax filings from the sample set of taxpayers) within a pre-determined tolerance range. Specifically, when the income amount, marital status, age of the user, a number of dependents, age of the dependent, home ownership, residence zip code, and/or self-employment status of historical tax filings are used as inputs to the neural network, the neural network outputs calculated tax refund amounts that match historical tax refund amounts within the pre-determined tolerance range. In one or more embodiments, the one or more formulae (e.g., the neural network (133)) may be adjusted based on current information of IRS tax rates, IRS payroll withholding charts, average price per home and average mortgage interest paid on such homes, average charitable contributions per income level, average age of children in U.S. households, etc. For example, such current information may be retrieved from the tax table (131) and home price database (132) to adjust the neural network (133).

Accordingly, the tax refund range estimate is calculated as a function of the reduced portion using the one or more formulae, such as the neural network (133). In one or more embodiments, the user module (126) is further configured to present the tax refund range estimate to the user (106). In one or more embodiments, the tax refund range estimate is sent from the computer system (120) to the client device (105). For example, the tax refund range estimate may be displayed on the client device (105) and presented to the user (106). In another example, the tax refund range estimate may be played back using a speaker of the client device (105) and presented to the user (106).

In one or more embodiments, the user module (126) is further configured to receive, in response to presenting the tax refund range estimate to the user (106), a user request to prepare a tax return. For example, after viewing the tax refund range estimate, the user (106) may be confident to prepare the tax return using the tax return preparation application (122). In another example, after viewing the tax refund range estimate, the user (106) may be motivated to immediately prepare the tax return so that the tax refund may be received by the user (106) as soon as possible. Accordingly, the user module (126) requests and receives, from the user (106) and in response to the user request, the remainder portion for later use when preparing a tax filing for the user (106). For example, the tax filing may be prepared immediately or some time later after receiving the remainder portion.

In one or more embodiments, the user (106) may provide the remainder portion using a different interface (i.e., separate from the client device (105)) to the computer system (120) where this different interface may be more efficient for the user (106) to enter the remainder portion. For example, this different interface may include a full size physical keyboard (not shown) instead of a virtual keypad (not shown) on the client device (105) (e.g., a smart phone). For example, the interface using the full size physical keyboard may be represented by the direct arrow from the user (106) to the computer system (120) and my be part of the computer system (120) or part of a desktop computer (not shown) coupled to the computer system (120). Alternatively, the full size physical keyboard may be an add-on option to the client device (105) (e.g., a smart phone or a tablet computer with a wireless keyboard interface).

In one or more embodiments, the tax refund range estimator (121) includes a deduction analyzer (124) that is configured to determine, using a pre-determined algorithm (i) a mortgage interest estimate based on the home ownership and/or the residence zip code contained in the reduced portion; and (ii) an expense estimate based on one or more of the income amount, the age of the user, the number of dependents, the age of the dependent, and the residence zip code contained in the reduced portion. For example, the deduction analyzer (124) may retrieve a home price estimate from the home price database (132) based on the residence zip code, such that the mortgage interest estimate can be determined based on the home price estimate. In one or more embodiments, home price database (132) may be retrieved from various third party sources including government and private party sources that stored information such as average price per home and average mortgage interest paid on such homes, etc. In another example, the deduction analyzer (124) may use the neural network (133) to determine the mortgage interest estimate and the expense estimate in a similar manner as how the neural network (133) is trained and used to directly determine calculated tax refund amounts, as described above.

In one or more embodiments, the tax refund range estimator (121) includes a tax analyzer (123) that is configured to (i) calculate a taxable income based on the income amount contained in the reduced portion as well as the mortgage interest estimate and the expense estimate as determined by the deduction analyzer (124), (ii) determine a tax estimate from the tax table (131) based on the taxable income as well as the marital status and the number of dependents contained in the reduced portion, and (iii) determine a tax withholding estimate based on one or more of the income amount, the marital status, the number of dependents, and the self-employment status that are contained in the reduced portion. Accordingly, the tax analyzer (123) calculates the tax refund range estimate based on the tax estimate and the tax withholding estimate. Specifically, the tax refund range estimate equals the difference between the tax estimate range and the tax withholding range estimate. In particular, the tax refund is a positive amount if the tax estimate is less than the tax withholding estimate. In contrast, the tax refund is a negative amount, indicating a tax due amount, if the tax estimate exceeds the tax withholding estimate.

Figure 2:
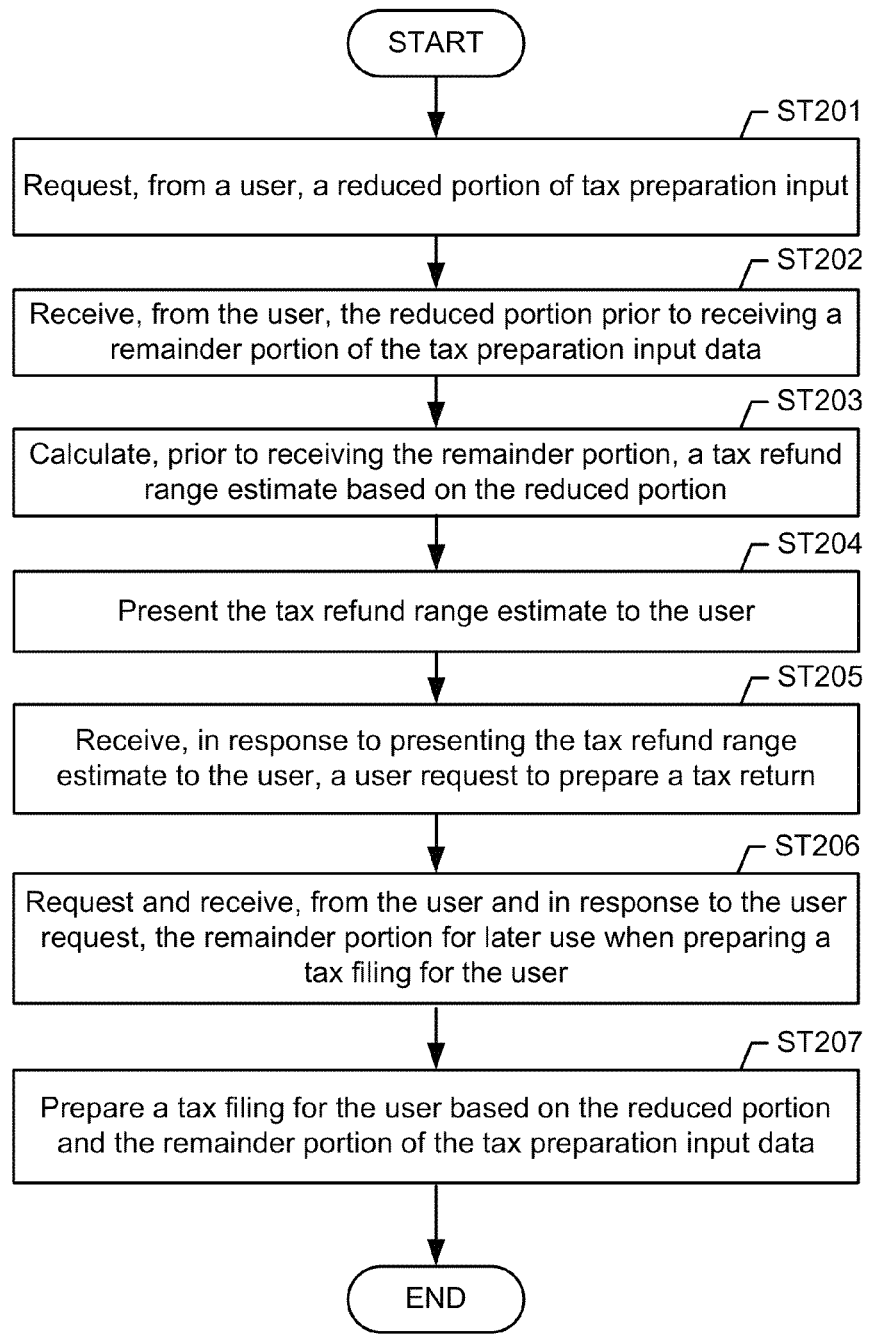
FIG. 2 shows a flowchart of a method for estimating high level tax refund in accordance with one or more embodiments of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method described in reference to FIG. 2 may be practiced using the system (100), in particular the tax refund range estimator (121).

Initially in Step 201, a reduced portion of tax preparation input data is requested from a user. In one or more embodiments, the request may be presented to the user using a device with limited user data entry capability (e.g., a smart phone or a tablet computer with a virtual keyboard and/or voice input). For example, the request may include less than 10 questions for the user to answer that are sufficient to cover the reduced portion, which may include an income amount, marital status, age of the user, a number of dependents, age of the dependent, home ownership, residence zip code, and/or self-employment status.

In Step 202, the reduced portion is received from the user prior to receiving a remainder portion of the tax preparation input data. For example, the reduced portion may be received using the aforementioned device with limited user data entry capability, such as a smart phone or a tablet computer.

In Step 203, a tax refund range estimate is calculated, prior to receiving the remainder portion, based on the reduced portion. In one or more embodiments, the tax refund range estimate is calculated as a function of the reduced portion based on IRS tax rates, IRS payroll withholding charts, average price per home and average mortgage interest paid on such homes, average charitable contributions per income level, average age of children in U.S. households, etc. In one or more embodiments, the tax refund range estimate is calculated on the aforementioned device with limited user data entry capability, such as a smart phone or a tablet computer. In one or more embodiments, the tax refund range estimate is calculated on a computer server coupled to the aforementioned device with limited user data entry capability. In one or more embodiments, the tax refund range estimate is calculated using the tax analyzer (123), the deduction analyzer (124), and the refund calculator (125) shown in FIG. 1 above.

In Step 204, the tax refund range estimate is presented to the user. For example, tax refund range estimate may be presented using the aforementioned device with limited user data entry capability, such as a smart phone or a tablet computer. In one or more embodiments, a tax return preparation application is recommended to the user when the tax return range estimate is presented.

In Step 205, a user request to prepare a tax return is received in response to presenting the tax refund range estimate to the user. For example, after viewing the tax refund range estimate, the user may be confident to prepare the tax return using the recommended tax return preparation application. In another example, after viewing the tax refund range estimate, the user may be motivated to immediately prepare the tax return so that the tax refund may be received earlier. In one or more embodiments, the user request may be received by the aforementioned device with limited user data entry capability, such as a smart phone or a tablet computer. In one or more embodiments, the user request may be received by a computer server directly or via the aforementioned device with limited user data entry capability.

In response to the user request, in Step 206, the remainder portion is requested and received from the user for later use when preparing the tax filing for the user. In one or more embodiments, the remainder portion may be requested by the aforementioned device with limited user data entry capability, such as a smart phone or a tablet computer. In one or more embodiments, the remainder portion may be requested by a computer server directly or via the aforementioned device with limited user data entry capability. In one or more embodiments, the remainder portion is received by the computer server for preparing the tax filing for the user. In one or more embodiments, the remainder portion is received by the computer server from the user using a different interface than the aforementioned device with limited user data entry capability. For example, this different interface may include a full size physical keyboard instead of a virtual keypad and/or voice input on a smart phone or a tablet computer.

In Step 207, the tax filing is prepared based on the tax preparation input data including both the reduced portion and the remainder portion. For example, the tax filing may be prepared immediately or some time later after receiving the remainder portion.

Figure 3A:
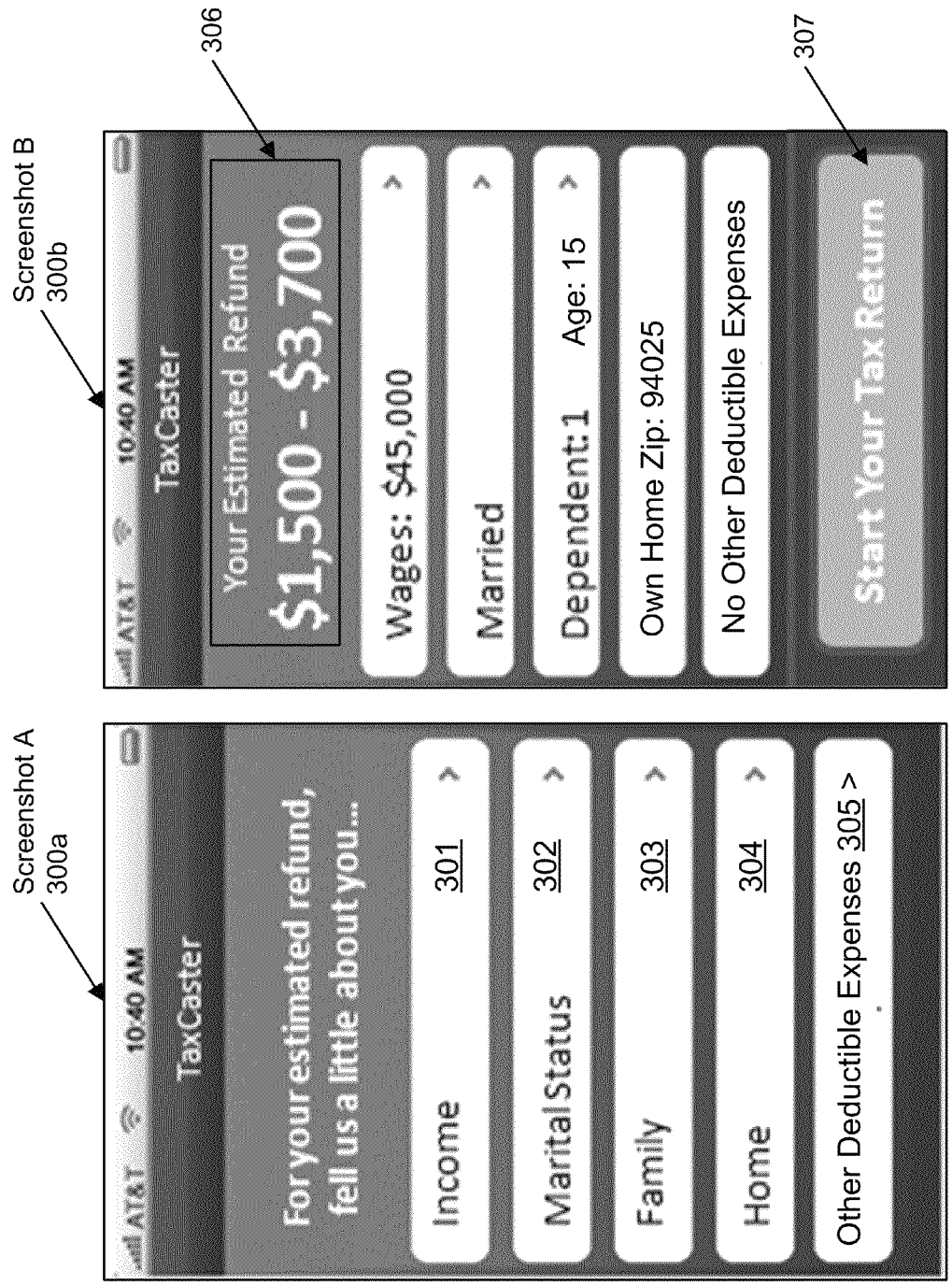
FIGS. 3A and 3B shows an example of screenshots used for estimating high level tax refund in accordance with one or more embodiments of the invention.
Figure 3B:
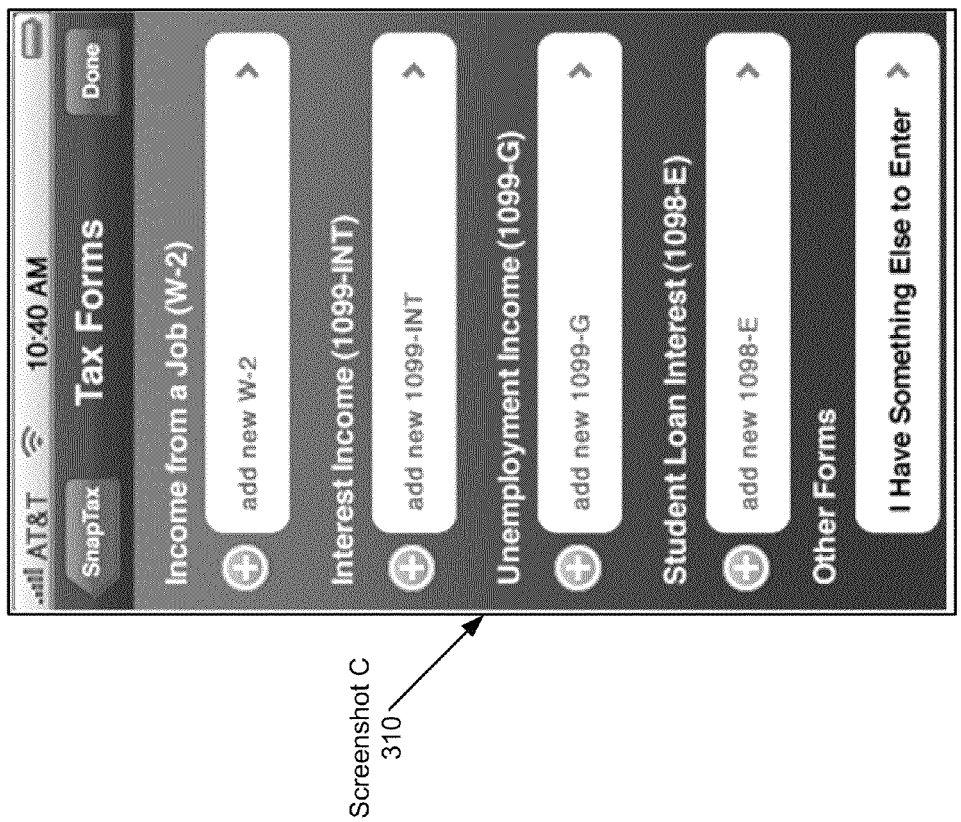

FIGS. 3A and 3B show an application example in accordance with one or more embodiments of the invention. This example application may be practiced using the system (100) of FIG. 1 and based on the method described with respect to FIG. 2 above. The concept of providing tax refund/balance due range does not exist in industry. As shown in FIGS. 3A and 3B, a new tax preparation experience is customized for a taxpayer using a smart phone to estimate his/her tax refund range.

FIG. 3A shows a screenshot A (300a) depicting a taxpayer user being asked the following questions: income (301), marital status (302), family information (303), home information (304), and other deductible expenses (305). FIG. 3A also shows a screenshot B (300b) depicting a real-time calculated estimated tax refund range (306) while the taxpayer user answers the questions (301) through (305). For example, as the user clicks the question income (301), a drop down menu (not shown) may display allowing the taxpayer user to make a selection to answer. As shown in the screenshot (300b), the taxpayer user has selected to enter a wage of $45,000. Although not shown, the taxpayer user may also select to enter a non-wage income, such as a tip or other self-employment income. In response to the user provided information (referred to as the reduced portion in the foregoing description in reference to FIGS. 1-2 above) of $45,000 in wage income, the real-time calculated estimated tax refund range (306) displays "Your Estimated Refund Range $500-$4,000" (not shown) based on the $45,000 annual income and historical tax filing information of an average taxpayer earning approximately $45,000 in prior year wage income. Subsequently, the taxpayer user proceeds to complete the rest of the questions shown in the screenshot A (300a) and the real-time calculated estimated tax refund range (306) is updated to display "Your Estimated Refund Range $1,500-$3,700," as shown in the screenshot B (300b). The taxpayer user may answer each of the questions by capturing documents through photo, manually enter data, import data, upload data, etc. using the smart phone and in doing so narrows the range of the tax refund range estimate and get a more accurate refund amount as additional information is entered. Upon viewing how the real-time calculated estimated tax refund range (306) shows the high level tax refund range estimates, the taxpayer user may decide to prepare the tax filing by activating the command button (307), which takes the taxpayer user to the interface shown in FIG. 3B.

FIG. 3B shows a screenshot C (310) depicting a user interface window allowing the taxpayer user to enter the rest of the tax preparation input data (referred to as the remainder portion in the foregoing description in reference to FIGS. 1-2 above) and prepare the tax filing. As noted above, the screenshot C (310) may be on the same smart phone as the screenshot A (300a) and screenshot B (300b). Alternatively, the screenshot C (310) may be on a different device than the smart phone, such as a tablet computer, a notebook computer, or other computing device that is configured to prepare the tax filing for the taxpayer user.

Figure 4:
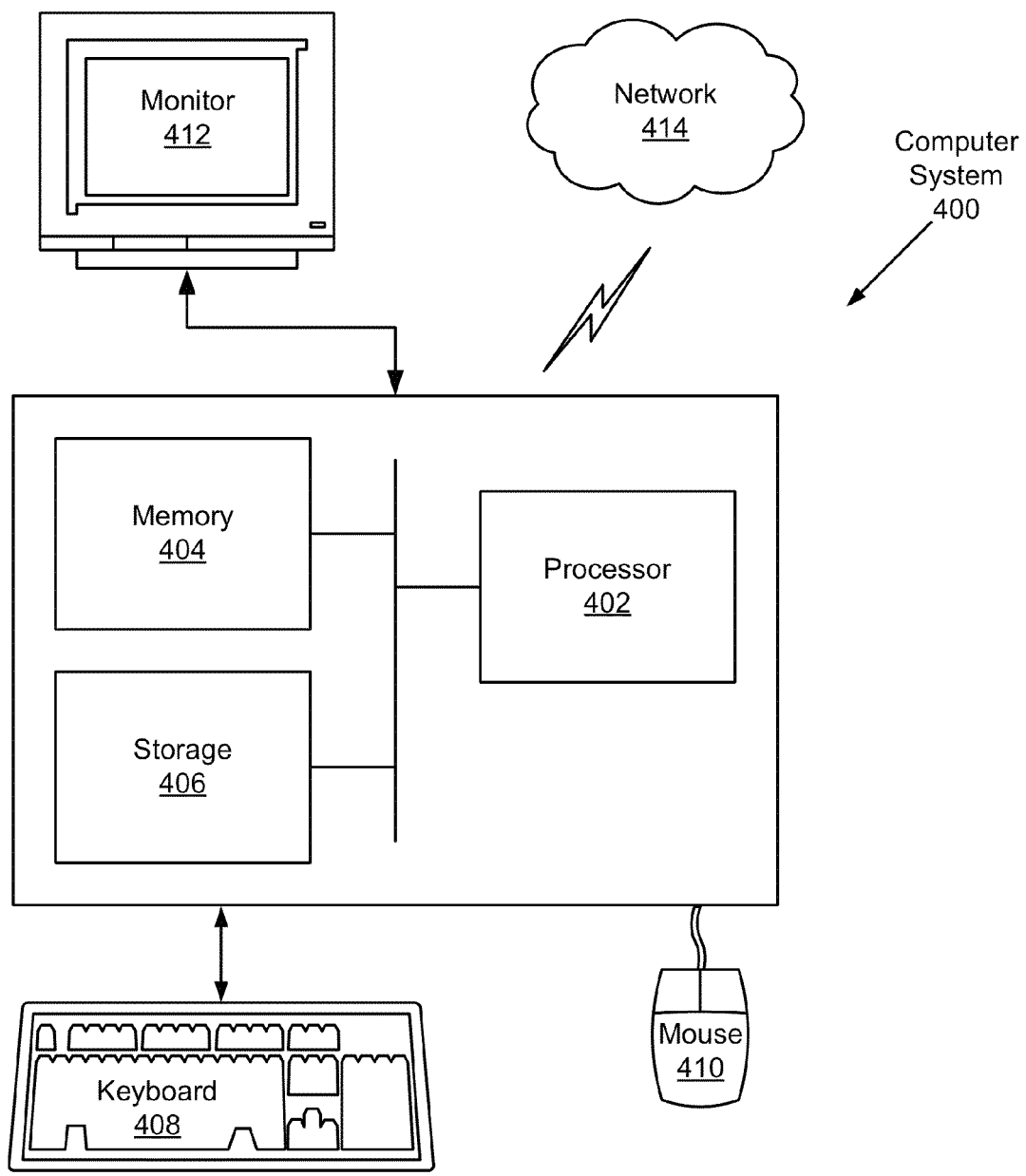
FIG. 4 shows a diagram of a computer system in accordance with one or more embodiments of the invention.

Embodiments of the invention may be implemented on virtually any type of computer regardless of the platform being used. For example, as shown in FIG. 4, a computer system (400) includes one or more processor(s) (402) such as a central processing unit (CPU), integrated circuit, or other hardware processor, associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer system (400) may also include input means, such as a keyboard (408), a mouse (410), or a microphone (not shown). Further, the computer system (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection. Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a non-transitory computer readable storage medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method to estimate a tax refund range, comprising:
receiving, by a computer processor and from a user, a subset portion of tax preparation input data prior to receiving a remainder portion of the tax preparation input data,
wherein the tax preparation input data comprises the remainder portion and the subset portion, and the tax preparation input data is used when preparing a tax filing for the user, and
wherein the subset portion comprises less than ten items;
calculating, by the computer processor and prior to receiving the remainder portion, a tax refund range estimate based on the subset portion and on information retrieved from a tax table;

presenting the tax refund range estimate to the user; and
receiving, in response to presenting the tax refund range estimate to the user, the remainder portion for later use when preparing the tax filing for the user.

2. The method of claim 1, further comprising:
requesting, from the user, the subset portion comprising at least one selected from a group consisting of an income amount, marital status, age of the user, a number of dependents, age of the dependent, home ownership, residence zip code, and self-employment status.

3. The method of claim 2, further comprising:
determining, using a pre-determined algorithm:
   a mortgage interest estimate based on at least one selected from a group consisting of the home ownership and the residence zip code;
   an expense estimate based on at least one selected from a group consisting of the income amount, the age of the user, the number of dependents, the age of the dependent, the residence zip code; and
   a tax withholding estimate based on at least one selected from a group consisting of the income amount, the marital status, the number of dependents, and the self-employment status,
      wherein the tax refund range estimate is calculated based on the income amount, the mortgage interest estimate, the expense estimate, and the tax withholding estimate.

4. The method of claim 3, further comprising:
retrieving a home price estimate from a home price database based on the residence zip code,
   wherein the mortgage interest estimate is determined based on the home price estimate.

5. The method of claim 3, further comprising:
calculating a taxable income based on the income amount, the mortgage interest estimate, and the expense estimate; and
determining a tax estimate from the tax table based on the taxable income, the marital status, and the number of dependents,
   wherein the tax refund range estimate is calculated based on the tax estimate and the tax withholding estimate.

6. The method of claim 3, further comprising:
identifying a neural network for determining at least one selected from a group consisting of the mortgage interest estimate, the expense estimate, and the tax withholding estimate,
   wherein the neural network is generated based on historical tax filings, and
   wherein the pre-determined algorithm comprises the neural network.

7. The method of claim 1, further comprising:
receiving, in response to presenting the tax refund range estimate to the user, a user request to prepare a tax return; and
requesting, from the user and in response to the user request, the remainder portion.

8. A system to estimate a tax refund range, comprising:
a processor;
a user module executing on the processor and configured to:
   request, from a user, a subset portion comprising less than ten items,
   receive, from the user, the subset portion of tax preparation input data prior to receiving a remainder portion of the tax preparation input data wherein the tax preparation input data comprises the remainder portion and the subset portion, and the tax preparation input data is used when preparing a tax filing for the user;
   present a tax refund range estimate to the user; and
   receive, in response to presenting the tax refund range estimate to the user, the remainder portion for later use when preparing the tax filing for the user; and
a refund calculator executing on the processor and configured to:
   calculate, prior to receiving the remainder portion, the tax refund range estimate based on the subset portion and on information retrieved from a tax table.

9. The system of claim 8, the user module further configured to
request, from the user, the subset portion comprising at least one selected from a group consisting of an income amount, marital status, age of the user, a number of dependents, age of the dependent, home ownership, residence zip code, and self-employment status.

10. The system of claim 9, further comprising:
a deduction analyzer executing on the processor and configured to determine, using a pre-determined algorithm:
   a mortgage interest estimate based on at least one selected from a group consisting of the home ownership and the residence zip code; and
   an expense estimate based on at least one selected from a group consisting of the income amount, the age of the user, the number of dependents, the age of the dependent, the residence zip code; and
a tax analyzer executing on the processor and configured to determine, using the pre-determined algorithm:
   a tax withholding estimate based on at least one selected from a group consisting of the income amount, the marital status, the number of dependents, and the self-employment status,
      wherein the tax refund range estimate is calculated based on the income amount, the mortgage interest estimate, the expense estimate, and the tax withholding estimate.

11. The system of claim 10, the deduction analyzer further configured to:
retrieve a home price estimate from a home price database based on the residence zip code, wherein the mortgage interest estimate is determined based on the home price estimate.

12. The system of claim 10, the tax analyzer further configured to:
calculate a taxable income based on the income amount, the mortgage interest estimate, and the expense estimate; and
determine a tax estimate from the tax table based on the taxable income, the marital status, and the number of dependents,
   wherein the tax refund range estimate is calculated based on the tax estimate and the tax withholding estimate.

13. The system of claim 10, further comprising:
a neural network for determining at least one selected from a group consisting of the mortgage interest estimate, the expense estimate, and the tax withholding estimate,
   wherein the neural network is generated based on historical tax filings, and
   wherein the pre-determined algorithm comprises the neural network.

14. The system of claim 8, the user module further configured to:
- receive, in response to presenting the tax refund range estimate to the user, a user request to prepare a tax return; and
- request, from the user and in response to the user request, the remainder portion.

15. A non-transitory computer readable medium storing instructions to estimate a tax refund, the instructions, when executed by a computer processor, comprising functionality to:
- request, from a user, a subset portion comprising less than ten items.
- receive from the user, the subset portion of tax preparation input data prior to receiving a remainder portion of the tax preparation input data wherein the tax preparation input data comprises the remainder portion and the subset portion, and the tax preparation input data is used when preparing a tax filing for the user;
- calculate, prior to receiving the remainder portion, a tax refund range estimate based on the subset portion and on information retrieved from a tax table;
- present the tax refund range estimate to the user; and
- receive, in response to presenting the tax refund range estimate to the user, the remainder portion for later use when preparing the tax filing for the user.

16. The non-transitory computer readable medium of claim 15, the instructions, when executed by a computer processor, further comprising functionality to:
- request, from the user, the subset portion comprising at least one selected from a group consisting of an income amount, marital status, age of the user, a number of dependents, age of the dependent, home ownership, residence zip code, and self-employment status.

17. The non-transitory computer readable medium of claim 16, the instructions, when executed by a computer processor, further comprising functionality to:
- determine, using a pre-determined algorithm:
  - a mortgage interest estimate based on at least one selected from a group consisting of the home ownership and the residence zip code;
  - an expense estimate based on at least one selected from a group consisting of the income amount, the age of the user, the number of dependents, the age of the dependent, the residence zip code; and
  - a tax withholding estimate based on at least one selected from a group consisting of the income amount, the marital status, the number of dependents, and the self-employment status,
  - wherein the tax refund range estimate is calculated based on the income amount, the mortgage interest estimate, the expense estimate, and the tax withholding estimate.

18. The non-transitory computer readable medium of claim 17, the instructions, when executed by a computer processor, further comprising functionality to:
- retrieve a home price estimate from a home price database based on the residence zip code, wherein the mortgage interest estimate is determined based on the home price estimate.

19. The non-transitory computer readable medium of claim 17, the instructions, when executed by a computer processor, further comprising functionality to:
- calculate a taxable income based on the income amount, the mortgage interest estimate, and the expense estimate; and
- determine a tax estimate from the tax table based on the taxable income, the marital status, and the number of dependents,
  - wherein the tax refund range estimate is calculated based on the tax estimate and the tax withholding estimate.

20. The non-transitory computer readable medium of claim 17, the instructions, when executed by a computer processor, further comprising functionality to:
- identify a neural network for determining at least one selected from a group consisting of the mortgage interest estimate, the expense estimate, and the tax withholding estimate,
  - wherein the neural network is generated based on historical tax filings, and
  - wherein the pre-determined algorithm comprises the neural network.

21. The non-transitory computer readable medium of claim 15, the instructions, when executed by a computer processor, further comprising functionality to:
- receive, in response to presenting the tax refund range estimate to the user, a user request to prepare a tax return; and
- request, from the user and in response to the user request, the remainder portion.

* * * * *